May 5, 1959  A. DAVIS  2,885,565
AZIMUTH SENSING DEVICE
Filed May 2, 1957
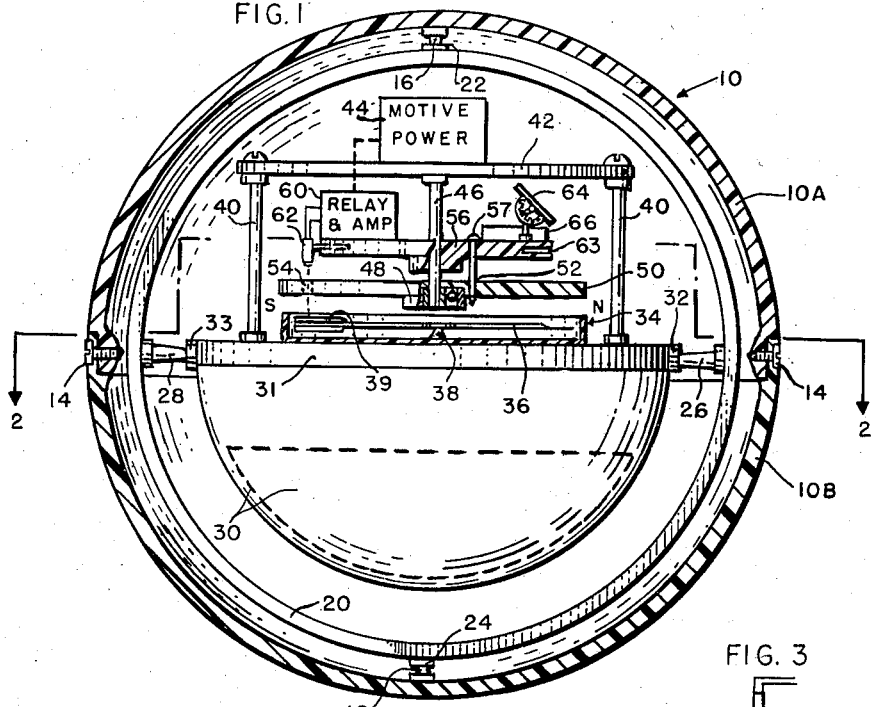
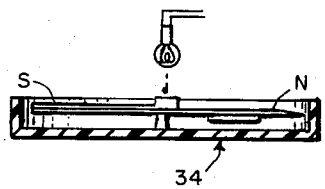
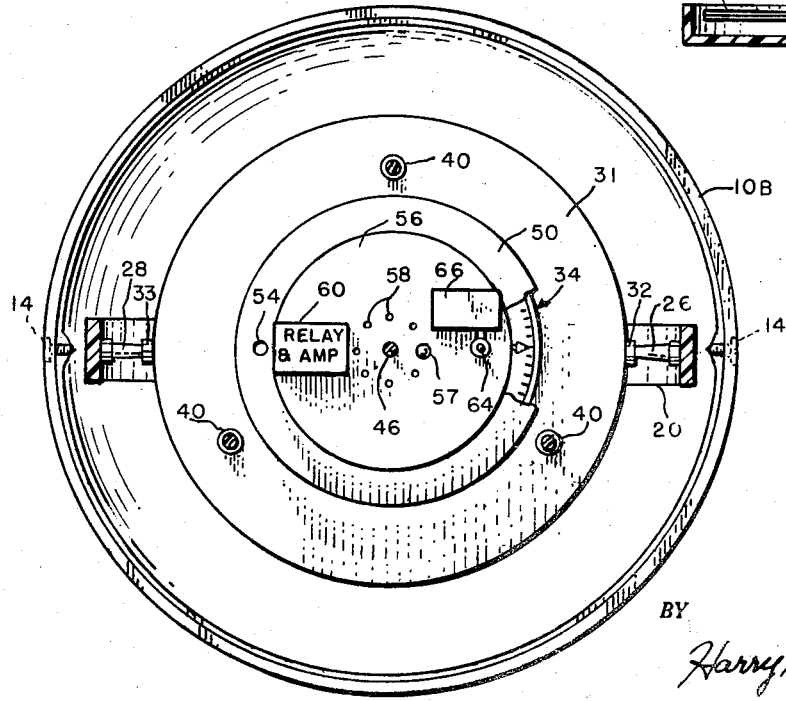
*INVENTOR.*
ALFRED DAVIS
BY
*Harry M. Saragovitz*
ATTORNEY

United States Patent Office 2,885,565
Patented May 5, 1959

2,885,565
AZIMUTH SENSING DEVICE

Alfred Davis, Little Silver, N.J., assignor to the United States of America as represented by the Secretary of the Army Application May 2, 1957, Serial No. 656,737

5 Claims. (Cl. 250—231)

(Granted under Title 35, U.S. Code (1952), sec. 266)

The invention described herein may be manufactured and used by or for the Government for governmental purposes, without the payment of any royalty thereon.

This invention relates to sensing devices and more particularly to a self-orienting azimuth sensing device.

In many instances it is desirable to orient an antenna or transducer in a prescribed elevation and azimuth position at an unmanned, inaccessible location remote from an observer or control station. Under these conditions an aeroplane parachute drop is used and it is impossible to ascertain whether the antenna or transducer is at the desired orientation.

It is a principal object of the present invention to provide a remote sensing device which will, upon landing, orient itself in a prescribed azimuth regardless of the type of terrain.

It is another object of the present invention to provide a remote sensing device which may be independently oriented to a preset azimuth and elevation position and maintained in the preset oriented position after being dropped at the remote location.

Briefly, the present invention is directed to a self-orienting azimuth sensing device which includes a hollow sphere, a weighted body having at least one flat surface, and means for pivotally mounting the weighted body within the sphere whereby the flat surface will be maintained in a level plane when the sphere is at rest. Also included are a compass needle pivotally mounted on the flat surface and a light emitting source mounted on the compass needle. In addition, there are included a rotatable shaft having its axis aligned with the pivot point of the compass needle and a power source for rotating the shaft. Included further are a first disk affixed to the shaft and rotatable therewith, a transducer secured to the first disk, a light detector adjustably positioned along the periphery of the first disk, and means responsive to the output of the light detector for deactivating the power source. Also included is a second disk freely rotatable about the shaft intermediate the first disk and the compass needle. The second disk is provided with an aperture for permitting the passage of light from the light emitting source to the light detector. Further included are means for initially locking the first and second disks in a predetermined relative position corresponding to a desired azimuth position of the transducer whereby when the light source, the aperture, and the light detector are aligned, the power source will be deactivated thereby stopping the rotation of the shaft, and the transducer will be at the desired azimuth position.

For a better understanding of the invention together with other and further objects thereof, reference is had to the following description taken in connection with the accompanying drawings in which:

Fig. 1 is a side elevation, partially in cross-section, of the present invention;

Fig. 2 is a plan view taken along line 2—2 of Fig. 1; and

Fig. 3 illustrates a light source arrangement which may be used in Fig. 1.

Referring now to Figs. 1 and 2 of the drawing, at 10 there is shown a hollow sphere comprising two separable hollow hemispheres 10A and 10B made of a suitable plastic material. Lock screws 14 are provided to securely fasten one hemisphere to the other when they are superimposed to form the hollow sphere 10. A pair of diametrically opposed pivots 16 and 18 extend from the respective inner surfaces of hemispheres 10A and 10B to support a plastic ring 20, preferably a truncated sphere, concentrically positioned within sphere 10. Diametrically opposed recesses 22 and 24 are provided on the outer surface of ring 20 to accept the respective ends of pivots 16 and 18. Ring 20 is thus supported in position within hollow sphere 10 so that it is free to swing on the axially aligned pivots 16 and 18. Extending from the inner surface of ring 20 are a pair of diametrically opposed pivots 26 and 28 which are aligned along an axis orthogonal with the diametric axis along which pivots 16 and 18 are aligned. As shown, pivots 26 and 28 support a weighted body 30, preferably in the shape of a hemisphere, concentrically positioned within ring 20 and having an exposed flat surface as at 31 colinear with the pivots 26 and 28. Weighted body 30 is made of a non-magnetic material and is provided with a pair of diametrically opposed recesses 32 and 33 to accept the respective ends of the axially aligned pivots 26 and 28. Thus, weighted body 30 is free to swing axially on pivots 26 and 28 and is acted upon by the force of gravity. With ring 20 mounted within sphere 10 as hereinabove described, a gimbals arrangement is formed and in accordance with well known principles, weighted body 30 will always remain plump and flat surface 31 will remain level when sphere 10 is at rest.

Affixed to platform 31 is a magnetic compass 34 having its indicating needle 36 pivoted at a point 38 which, preferably, is positioned at the intersection of the axis along which pivots, or points of suspension, 16 and 18 are aligned and the axis along which pivots 26 and 28 are aligned. Pivot point 38 may also be considered the geometric center of the entire structure. The north indicator of compass needle 36 is labeled N and the south indicator of compass needle 36 is labeled S. The south indicator is provided with a counterweight in the usual manner and is coated with a well-known material 39 adapted to emit some form of visible light. One source of such visible light may be provided by utilizing beta radiation from a radioactive element, strontium-90, for example, to bombard zinc or lead sulphide coated thereon. Another arrangement adapted to provide a source of visible light may comprise an incandescent lamp arranged such that its light enters a piece of Lucite mounted on the south indicating portion of compass needle 36 as shown in Fig. 3. In such an arrangement, the north indicating portion of the needle will be counterweighted in the usual manner.

Extending upwardly from flat surface 31 of weighted body 30 are three spaced posts 40 made of a suitable plastic material and preferably arranged symmetrical with respect to compass 34 along a diametric axis. Affixed to the free ends of posts 40 is a plastic platform or base 42 positioned parallel to flat surface 31. Mounted on platform 42 and affixed thereto is a motive power source 44 which includes a conventional time-clock arrangement (not shown) for controlling the activation of the motor which, in turn, is adapted to rotatably drive a shaft 46 having is axis aligned with the diametric axis along which pivots 16 and 18 are aligned. As shown, shaft 46 extends through platform 42 towards pivot point 38 with its free end terminated slightly above compass 34 and journaled in a bearing 48. Affixed to the outer race of bearing 48 is a disk 50 positioned parallel to flat surface 31 of weighted body 30. Disk 50 is provided with a concentrically arranged series of apertures 52 intermediate shaft 46 and the outer periphery of disk 50 and also provided with a single aperture 54, preferably a rectangular slit, intermediate the outer periphery of disk 50 and the concentrically arranged apertures 52. Single aperture 54 is so positioned that the emitted light from source 39 will pass therethrough when aperture 54 is superimposed over source 39. Affixed to shaft 46 above disk 50 but in close proximity thereto, is a disk 56 which is positioned parallel to disk 50. Disk 56 is provided with a concentrically arranged series of apertures 58 which are aligned with the apertures 52 of disk 50. As shown, the diameter of disk 56 is made smaller than that of disk 50 so that the single aperture 54 in disk 50 is never blocked by disk 56. Thus, regardless of the relative positions of disks 50 and 56, whenever aperture 54 and the light source 39 are superimposed, the emitted light will pass through the single aperture 54. Disks 50 and 56 may be locked in any relative position by inserting a locking pin 57 through any two of the concentric apertures 52 and 58 which may be in alignment. It is to be understood, of course, that any other suitable locking means well-known in the art may be used.

Mounted on the upper flat surface of disk 56 is a self-contained amplifier and relay unit 60 adapted to be actuated by the output of a light detector 62 which may comprise a photosensitive transistor or other suitable light detector well-known in the art. Light detector 62 is circumferentially positioned on disk 56 relative to aperture 54 in disk 50 by any suitable means such as a peripheral groove 63 such that it will intercept the emitted light passing from source 39 through aperture 54 when aperture 54 and source 39 are superimposed as hereinabove described. The output of amplifier and relay unit 60 is coupled to motive power source 44 by any suitable means known in the art, e.g., slip rings, in a manner such that when the relay part of unit 60 is energized, it will operate to cut off the power in motive source 44. The structure whose azimuth position is to be self-oriented is shown as an antenna or transducer 64 which is also mounted to the upper flat surface of disk 56. Antenna 64 may comprise the receiving and transmitting antenna of a transponder represented by the block 66 also mounted on disk 56. Suitable means may be provided to position and maintain antenna 64 at a prescribed elevation angle.

In discussing the operation of the present invention, it is to be assumed that antenna 64 is set at the prescribed elevation angle and that the north direction of the area where the device is to be operated is known. It is also to be assumed that the timing mechanism in motive power source 44 has been adjusted so that the power source 44 will begin to operate only after a prescribed delay in order to allow the sphere to orient itself in the area in which it may be dropped by parachute. The disks 50 and 56 are locked together in a relative position and the light detector 62 properly adjusted over aperture 54 before being dropped such that when the aperture 54 is over the light emitting source 39 the antenna or transducer 64 will be in the desired azimuth position. When the entire structure lands in the assigned area and finally comes to rest, aperture 54 may be in any random position with respect to the light emitting source 39 on compass needle 36, which of course will be oriented in the north-south direction. After the prescribed delay, motive source 44 will operate to rotate shaft 46 to which disk 56 is attached. Since disk 56 and disk 50 are locked together, they will be rotated simultaneously. When aperture 54 passes over light emitting source 39, light detector 62 will cause the relay in unit 60 to become energized and thus cut off the power applied to motive source 44 as hereinabove described so that shaft 46 will no longer be rotatably driven. Hence, the transducer 64 will be at the desired azimuth position.

While there has been described what is at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A self-orienting azimuth sensing device comprising a hollow sphere, a weighted body having at least one flat surface, means for pivotally mounting said weighted body within said sphere along an axis orthogonal to a diametric axis of said sphere whereby said flat surface will be maintained in a level plane when said sphere is at rest, a compass needle pivotally mounted on said flat surface, a light emitting source mounted on said compass needle, a rotatable shaft having its axis aligned with the pivot point of said compass needle, power means for rotating said shaft, a first disk affixed to said shaft and rotatable therewith, said disk having a transducer secured thereto, a light detector adjustably positioned along the periphery of said first disk, means responsive to the output of said light detector for deactivating said power means, a second disk freely rotatable about said shaft intermediate said first disk and said compass needle and having an aperture therethrough for permitting the passage of light from said light emitting source to said light detector, and means for initially locking said first and second disks in a predetermined relative position corresponding to a desired azimuth position of said transducer whereby when said light emitting source, said aperture, and said light detector are in alignment, said power means will be deactivated and said transducer will be at the desired azimuth position.

2. A self-orienting azimuth sensing device comprising a hollow sphere, a pair of opposed pivots aligned along a diametric axis of said sphere, a weighted body having at least one flat surface, means mounted on said pair of pivots and including means for axially supporting said weighted body along an axis orthogonal to said diametric axis whereby said flat surface is maintained in a level plane when said sphere is at rest, a compass needle pivotally mounted on said flat surface substantially at the point of intersection of said orthogonal axes, a light emitting source mounted on said compass needle, a rotatable shaft having its axis aligned with the pivot point of said compass needle, a power source for rotating said shaft, a first disk affixed to said shaft and rotatable therewith, said disk having a transducer secured thereto, a light detector adjustably positioned along the periphery of said first disk, means responsive to the output of said light detector for deactivating said power source, a second disk freely rotatable about said shaft intermediate said first disk and said compass needle and having an aperture therethrough for permitting the passage of light from said light emitting source to said light detector, and means for initially locking said first and second disks in a predetermined relative position corresponding to a desired azimuth position of said transducer whereby when said light emitting source, said aperture, and said light detector are in alignment, said power source will be deactivated and said transducer will be at the desired azimuth position.

3. A self-orienting azimuth sensing device comprising a hollow sphere including a first pair of opposed pivots aligned along a diametric axis thereof, a truncated spherical ring mounted on said pivots and concentrically positioned within said hollow sphere, a second pair of opposed pivots extending from the inner surface of said ring and aligned along an axis orthogonal to said diametric axis, a weighted body mounted on said second pair of pivots and having an exposed flat surface colinear therewith, a compass needle pivotally mounted on said flat surface, a light emitting source mounted on said compass needle, a rotatable shaft having its axis aligned with the pivot point of said compass needle, power means affixed to said flat surface for rotating said shaft, a first disk affixed to said shaft and rotatable therewith, said disk having a transducer secured thereto, a light detector adjustably positioned along the periphery of said first disk, means responsive to the output of said light detector for deactivating said power means, a second disk freely rotatable about said shaft intermediate said first disk and said compass needle and having an aperture therethrough for permitting the passage of light from said light emitting source to said light detector, and means for initially locking said first and second disks in a predetermined relative position corresponding to a desired azimuth position of said transducer whereby when said light source, said aperture, and said light detector are in alignment, said power means will be deactivated and said transducer will be at the desired azimuth position.

4. A self-orienting azimuth sensing device comprising a hollow sphere including a first pair of opposed pivots aligned along a diametric axis thereof, a truncated spherical ring mounted on said pivots and concentrically positioned within said hollow sphere, a second pair of opposed pivots extending on from the inner surface of said ring and aligned along an axis orthogonal to said diametric axis, a weighted body mounted on said second pair of pivots and having an exposed flat surface colinear thereto, a compass needle pivotally mounted on said flat surface substantially at the point of intersection of said orthogonal axes, a light emitting source mounted on said compass needle, a rotatable shaft having its axis aligned with the pivot point of said compass needle, a power source affixed to said flat surface for rotating said shaft, a first disk affixed to said shaft and rotatable therewith, said disk having a transducer secured thereto, a light detector adjustably positioned along the periphery of said first disk, means responsive to the output of said light detector for deactivating said power source, a second disk freely rotatable about said shaft intermediate said first disk and said compass needle and having an aperture therethrough for permitting the passage of light from said light emitting source to said light detector, and means for initially locking said first and second disks in a predetermined relative position correspondng to a desired azimuth position of said transducer whereby when said light source, said aperture, and said light detector are in alignment, said power source will be deactivated and said transducer will be at the desired azimuth.

5. A self-orienting azimuth sensing device comprising a hollow sphere including a first pair of opposed pivots aligned along a diametric axis of said sphere, a truncated spherical ring mounted on said pivots and concentrically positioned within said hollow sphere, a second pair of opposed pivots extending from the inner surface of said ring and aligned along an axis orthogonal to said diametric axis, a weighted body mounted on said second pair of pivots and having an exposed flat surface colinear therewith, a compass needle pivotally mounted on said flat surface substantially at the point of intersection of said axes, a light emitting source mounted on said compass needle, a shaft rotatably driven by a motive power source and extending towards the pivot of said compass with the free end of said shaft proximally spaced from said compass pivot point, a first disk affixed to said shaft and rotatable therewith, said disk having a transducer secured thereto, a light detector adjustably positioned along the periphery of said first disk, means responsive to the output of said light detector for deactivating said power source, a second disk freely rotatably about said shaft intermediate said first disk and said compass needle and having an aperture therethrough for permitting the passage of light from said light emitting source to said light detector, and means for initially locking said first and second disks in a predetermined relative position corresponding to a desired azimuth position of said transducer whereby when said light source, said aperture, and said light detector are in alignment, said power source will be deactivated and said transducer will be at the desired azimuth position.

References Cited in the file of this patent

UNITED STATES PATENTS

| | | |
|---|---|---|
| 1,569,325 | Lieb | Jan. 12, 1926 |
| 2,063,906 | Boch | Dec. 15, 1936 |
| 2,080,511 | Sjostrand | May 18, 1937 |
| 2,364,908 | Miller | Dec. 12, 1944 |
| 2,425,329 | Joy | Aug. 12, 1947 |
| 2,480,134 | Harrington | Aug. 30, 1949 |
| 2,497,065 | Braddon | Feb. 14, 1950 |
| 2,777,070 | Stamper et al. | Jan. 8, 1957 |